United States Patent
Ward et al.

(10) Patent No.: US 7,159,926 B2
(45) Date of Patent: Jan. 9, 2007

(54) VEHICLE TRIM PANEL SECUREMENT

(75) Inventors: Kenneth H. Ward, Pearson, MI (US); David J. Otto, Lake Orion, MI (US)

(73) Assignee: Nicholas Plastics Incorporated, Allendale, MI (US)

( * ) Notice: Subject to any disclaimer, the term of this patent is extended or adjusted under 35 U.S.C. 154(b) by 125 days.

(21) Appl. No.: 11/105,694

(22) Filed: Apr. 14, 2005

(65) Prior Publication Data

US 2005/0230994 A1  Oct. 20, 2005

Related U.S. Application Data (60) Provisional application No. 60/609,722, filed on Sep. 14, 2004, provisional application No. 60/562,023, filed on Apr. 14, 2004.

(51) Int. Cl.
*B60J 5/00* (2006.01)

(52) U.S. Cl. .................................. 296/146.7; 296/1.08

(58) Field of Classification Search ............. 296/146.7, 296/148, 1.08
See application file for complete search history.

(56) References Cited

U.S. PATENT DOCUMENTS

| | | | |
|---|---|---|---|
| 3,354,584 A | 3/1966 | Parsons | |
| 5,170,586 A | 12/1992 | Ose et al. | |
| 5,388,371 A | 2/1995 | Nozaki | |
| 5,544,448 A | 8/1996 | Mass | |
| 5,775,030 A | 7/1998 | Hamabata | |
| 5,866,232 A | 2/1999 | Gatzmanga | |
| 6,128,859 A | 10/2000 | Vance | |
| 6,282,840 B1 | 9/2001 | Vance | |
| 6,401,394 B1 | 6/2002 | Nozaki | |
| 6,446,392 B1 | 9/2002 | Maki | |
| 6,623,832 B1 | 9/2003 | Greven | |

*Primary Examiner*—Lori L. Coletta
(74) *Attorney, Agent, or Firm*—Price, Heneveld, Cooper, DeWitt & Litton, LLP (57) ABSTRACT

A vehicle trim panel is secured to a vehicle structural panel by providing a vehicle trim fastener having spaced arms which embrace and overlie the legs on a mount which is seated over the edge of a vehicle structural panel. The embracing arms and corresponding legs prevent lateral shifting of the trim panel relative to the structural panel.

27 Claims, 7 Drawing Sheets

VEHICLE TRIM PANEL SECUREMENT

CROSS-REFERENCE TO RELATED APPLICATIONS

This application claims the benefit of U.S. Provisional Application No. 60/562,023, filed Apr. 14, 2004, and U.S. Provisional Application No. 60/609,722, filed Sep. 14, 2004, the entire contents of each of which are hereby incorporated herein by reference.

BACKGROUND OF THE INVENTION

The present invention relates to vehicle panels and more particularly to the securement of vehicle panels.

Vehicle panels include structural panels which are relatively rigid and secure, as for example, an inner door panel. They also include trim panels which hide unsightly mechanisms disposed within the structural panel. It is customary to secure a trim panel to a structural panel to protect, cover and/or hide the structural panel and the mechanisms disposed therein.

In one prior art device, this securement is achieved by providing a trim panel trim clip with a downwardly depending arm which seats in the channel of an inner belt weatherstrip which in turn is seated over the edge of an inner structural panel, such as an inner door panel. The arm includes a projection which engages a mating projection located inside the weatherstrip channel.

SUMMARY OF THE INVENTION

The present inventors have discovered that existing systems do not provide good stability to the trim panel relative to the structural panel. There is a tendency for the trim panel to move both vertically and laterally relative to the structural panel.

In the present invention, a vehicle trim panel is secured to a vehicle structural panel by providing a vehicle trim fastener having spaced arms which embrace and overlie the legs on a mount which is seated over the edge of a vehicle structural panel. The embracing arms and corresponding legs preventing lateral shifting of the trim panel relative to the structural panel.

In a preferred embodiment of the invention, the mating trim panel fastener arms and the legs on the mount have inter-engaging portions which restrict vertical movement of the trim panel fastener relative to the mount.

These and other features, advantages, and objects of the present invention will be further understood and appreciated by those skilled in the art by reference to the following specification, claims, and appended drawings.

DETAILED DESCRIPTION OF PREFERRED EMBODIMENT

As used herein, the term vehicle structural panel or structural panel is meant to include any panel in or on a vehicle that is capable of supporting the mount of the disclosed invention. This includes a vehicle structural panel such as a structural door frame panel but it is not meant to be limited to such a panel. Additionally, as used herein, vehicle trim panel or trim panel is not meant to be limited to a panel that decorates or adorns, but encompasses any panel that overlies the structural panel. This may be for example, a vehicle door interior trim panel but it is not meant to be limited to such a panel. Further, as used in the automotive industry, an inner belt weatherstrip is weather-stripping that is used to seal the top edge of an interior door structural panel and the corresponding window of a vehicle door. The present invention may be used as an inner belt weatherstrip but it is not meant to be limited to such a particular application.

Figure 1:
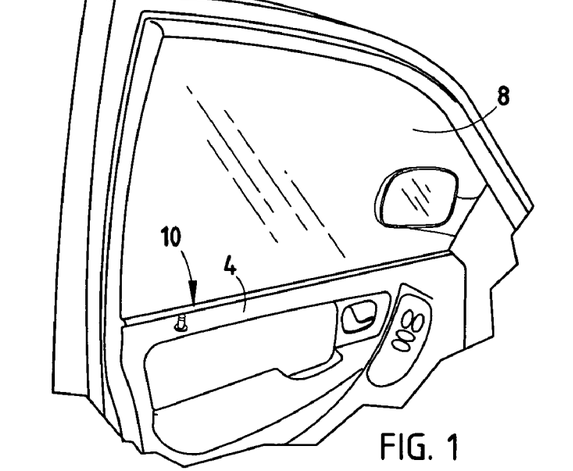
FIG. 1 is a perspective view of the vehicle trim panel securement assembly according to a preferred embodiment of the present invention, installed within a vehicle car door.
Figure 2:
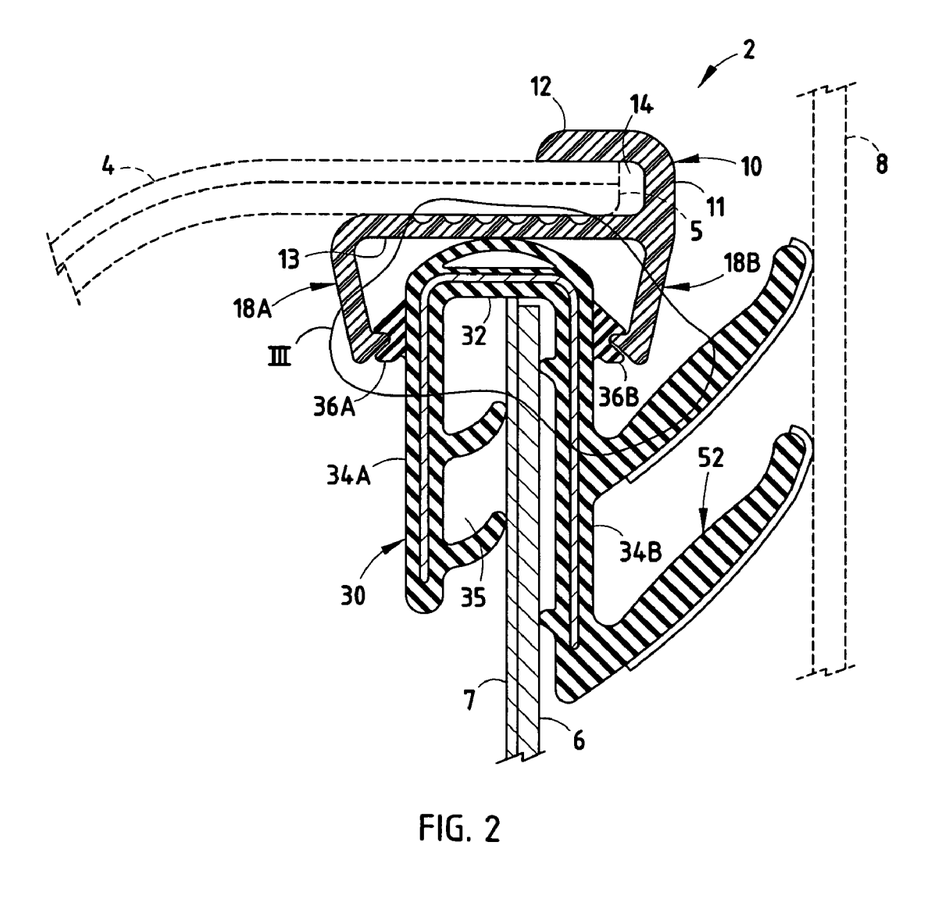
FIG. 2 is a cross-sectional view of the vehicle trim panel securement assembly of FIG. 1.

In a first embodiment, door trim panel 4 is secured to inner door structural panel 6 by vehicle trim panel securement assembly 2, which includes a 2-part fastening system comprising a panel fastener 10 and a mount 30 (FIGS. 1 and 2). Panel fastener 10 is seated over the top edge of vehicle trim panel 4 and includes at least a pair of spaced mount embracing arms 18A and 18B. Mount 30 is disposed on inner door structural panel 6 and includes a pair of spaced legs 34A and 34B. Arms 18A and 18B embracing mount 30 prevent lateral shifting of trim panel 4 relative to structural panel 6.

Figure 3:
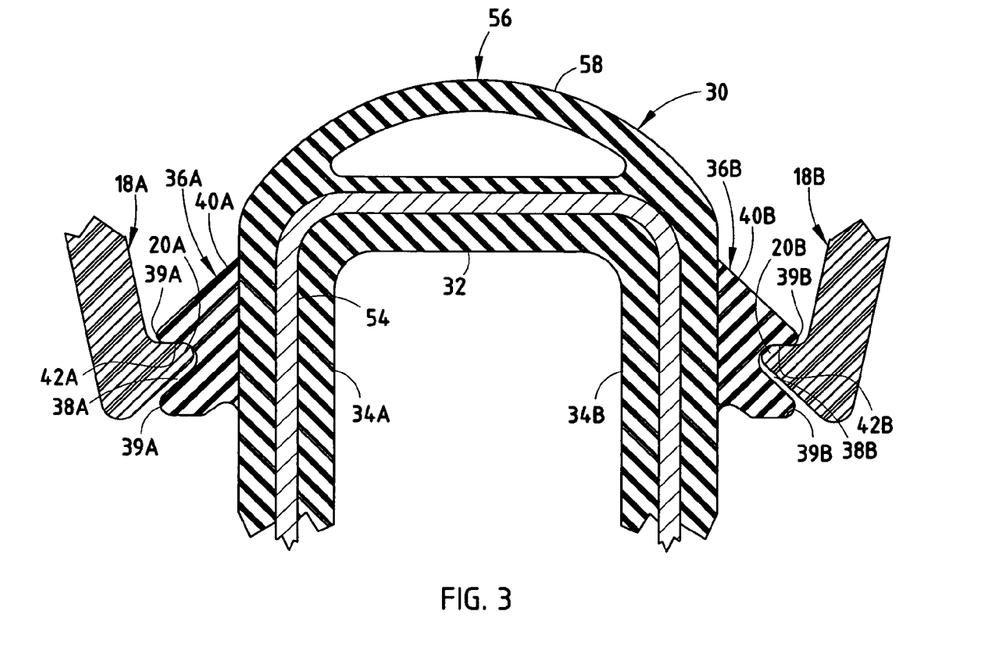
FIG. 3 is a partial cross-sectional view of area III of FIG. 2.

Mount 30 includes a pair of engagement strips 36A and 36B disposed on each leg 34A and 34B, respectively (FIGS. 2 and 3). Arms 18A and 18B of panel fastener 10 embrace, overlie and are generally held to mount 30 by engaging engagement strips 36A and 36B. As best seen in FIG. 3, this engagement is accomplished by providing at least one protrusion 20A and 20B on each arm 18A and 18B, respectively, and at least one receiving cavity or groove 38A and 38B on each engagement strip 36A and 36B, respectively (FIG. 3). Protrusions 20A and 20B engage cavities 38A and 38B, respectively, thereby affixing panel fastener 10 to mount 30 to restrict vertical movement of trim panel fastener 10 relative to mount 30. Alternatively, protrusions 20A and 20B are pushed entirely over engagement strips 36A and 36B such that protrusions 20A and 20B engage only the bottom edges of engagement strips 36A and 36B. This makes fastener 10 and mount 30 a two position fastening system.

Panel fastener 10 and mount 30 are generally elongated and preferably engaged along the entire length of the edge of the trim panel/structural panel interface (see FIG. 1). However, arms 18A and 18B and corresponding engagement strips 36A and 36B may alternately be disposed at discrete locations along the elongated assembly as the specific requirements dictate. Furthermore, one of the panel fastener 10 or the mount 30 may run the entire length of the elongated assembly and the other of the mount 30 or the panel fastener 10 may be disposed at discrete locations.

As shown in FIG. 2, one embodiment of panel fastener 10 includes a generally C-shaped fastener comprising a channel base 11, a first leg 12 and a second leg 13 which together define a channel 14. Channel 14 is sized to fit over an edge 5 of the trim panel thereby frictionally securing panel fastener 10 to trim panel 4. However, channel 14 may be sized differently to accommodate different securing mechanisms or methods and panel fastener 10 may be secured to trim panel 4 through the use of an adhesive, mechanical, or other fastening method such as heat staking, sonically welding or stapling. The C-shaped fastener illustrated in FIG. 2 allows fastener 10 to be secured to trim panel 4 while simultaneously covering the edge of the trim panel for aesthetic reasons.

Figure 4:
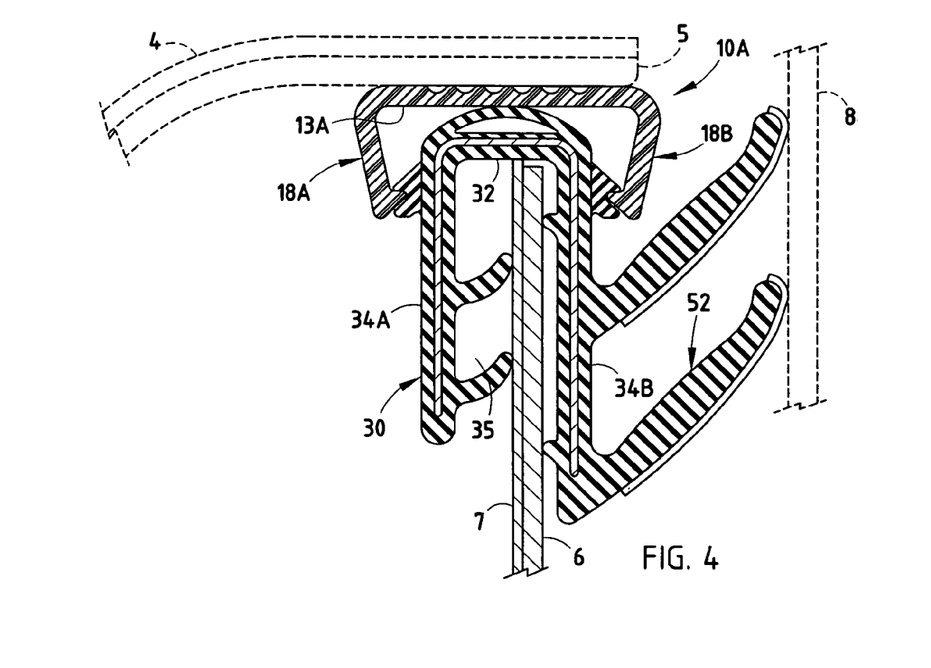
FIG. 4 is a cross-sectional view of an alternative embodiment of the vehicle trim panel securement assembly.

In an alternative embodiment as shown in FIG. 4, fastener 10A has a single leg to which arms 18A and 18B extend therefrom. This embodiment is secured to panel 4 adhesively or with a mechanical fastener. However, any other generally well known method could also be used. Further, this embodiment is shown as being disposed immediately adjacent the trim panel edge. However, this is not meant to be limiting and the fastener may be disposed further inboard or outboard of the trim panel depending on the particular requirements.

As described above, arms 18A and 18B of panel fastener 10 extend outwardly from leg 13 of panel fastener 10 and are flexibly molded or otherwise attached thereto. Arms 18A and 18B are resilient or flexible so that they may flex over mount 30, or more specifically, engagement strips 36A and 36B. This resiliency allows arms 18A and 18B to flex during engagement with mount 30 and to return towards their original non-flexed state when protrusions 20A and 20B reside with cavities 38A and 38B, preferably still exerting an inward force towards one another to aid in retention of protrusions 20A and 20B in cavities 38A and 38B.

Figure 5:
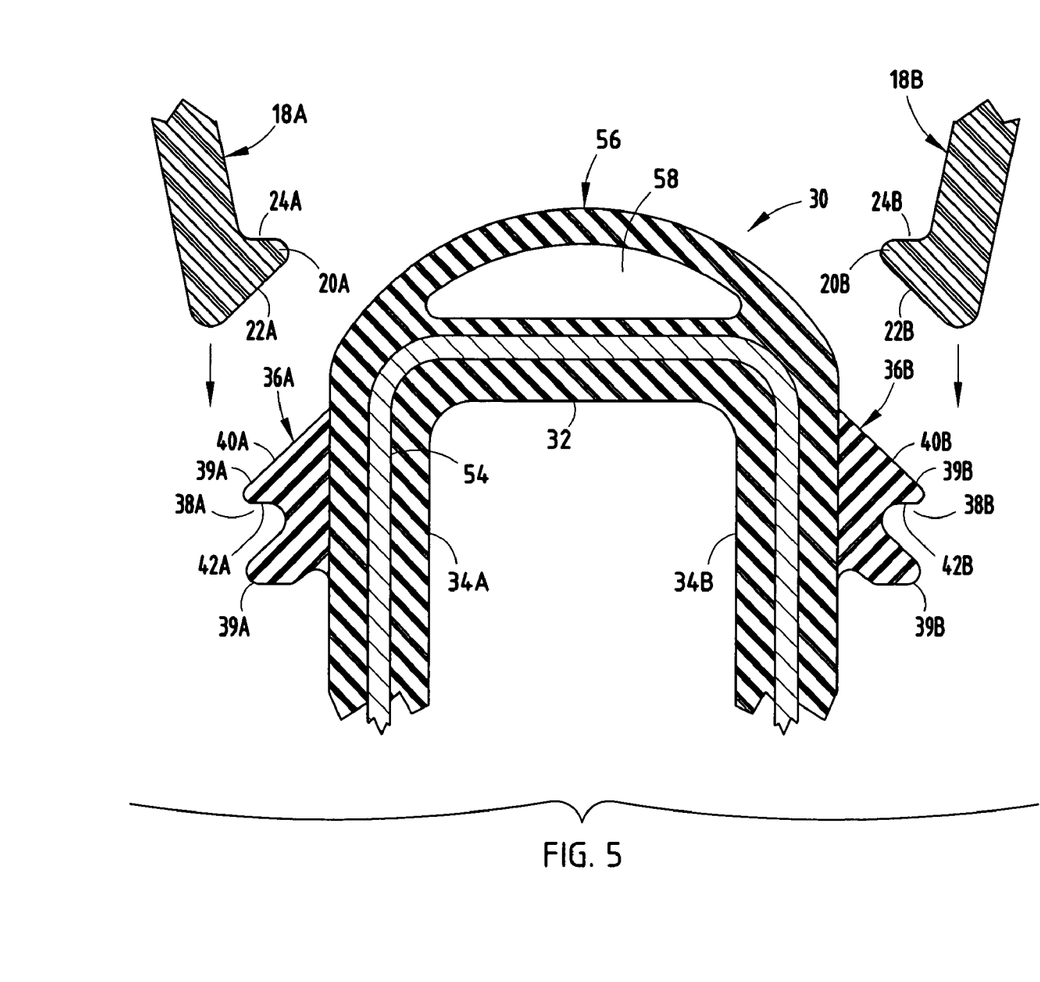
FIG. 5 is an enlarged exploded partial cross-sectional view of the vehicle trim panel securement assembly of FIG. 2.

Protrusions 20A and 20B of arms 18A and 18B are typically disposed at a distal end of arms 18A and 18B. As illustrated by FIG. 5, protrusions 20A and 20B include a tapered leading edge or ramp 22A and 22B, respectively, which aids the arms in sliding over engagement strips 36A and 36B. In one embodiment, protrusions 20A and 20B are shaped to generally correspond in size and shape to cavities 38A and 38B (discussed below) thereby forming a mating pair. Additionally, it is preferred to have an edge surface 24A or 24B of protrusions 20A and 20B which is similarly angled with the corresponding edge surface 42A and 42B of cavities 38A and 38B. In one embodiment, this angle is generally horizontal with respect to the assembly. However, edge surfaces 24A, 24B, 42A and 42B may take on various other shapes and/or angles to allow for more or less retention as the specific requirements dictate. This system whereby the arm protrusions are engaged within the leg cavities creates a "snap fit" which acts to positively retain protrusions 20A and 20B within cavities 38A and 38B. Additionally, edge surfaces 24A, 24B, 42A and 42B may include additional features such as, inter alia, ridges or protrusions to aid in their retention or fit.

In one embodiment, cavities 38A and 38B are created by disposing a plurality of protrusions 39A and 39B, respectively, on engagement strips 36A and 36B creating cavities 38A and 38B therebetween (FIG. 5). It is generally preferred, although not necessary, to have an angled or ramped surface 40A and 40B on each protrusion 39A and 39B which allows arms 18A and 18B to more easily flex over the protrusions upon installation. Similarly, it is generally preferred, although not necessary, for cavities 38A and 38B to have a planar surface 42A and 42B of which each planar surface 24A and 24B of protrusions 20A and 20B may rest against. Most preferably, both protrusions 20A and 20B and engagement strips 36A and 36B will have corresponding angled and planar surfaces that interact to aid in the installation and corresponding retention of the assembly.

Figure 7:
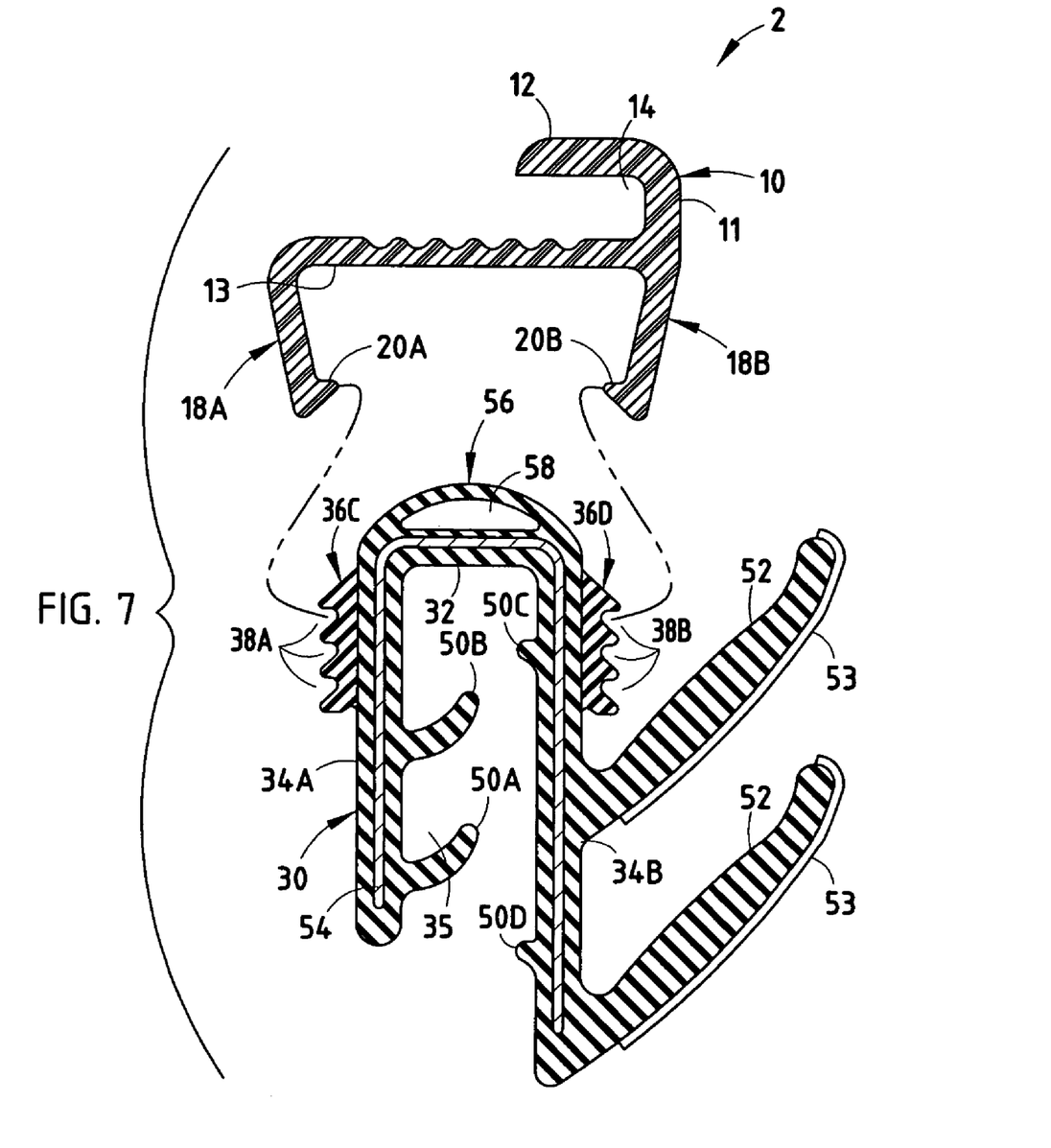
FIG. 7 is an exploded cross-sectional view of an alternative embodiment of the vehicle trim panel securement assembly.

Further, each engagement strip 36A or 36B may have more than one cavity. By having more than one cavity on each leg 34A and 34B, the panel fastener is made to be adjustable. In the preferred embodiment illustrated in FIG. 7, a plurality of cavities 38A and 38B are disposed on engagement strips 36C and 36D, respectively. This embodiment permits either protrusion 20A or 20B to be seated within any one of the plurality of cavities, thereby allowing the panel fastener 10 to be optimally positioned with respect to the mount 30 over a wide range of build tolerances between the two vehicle panels.

Figure 8:
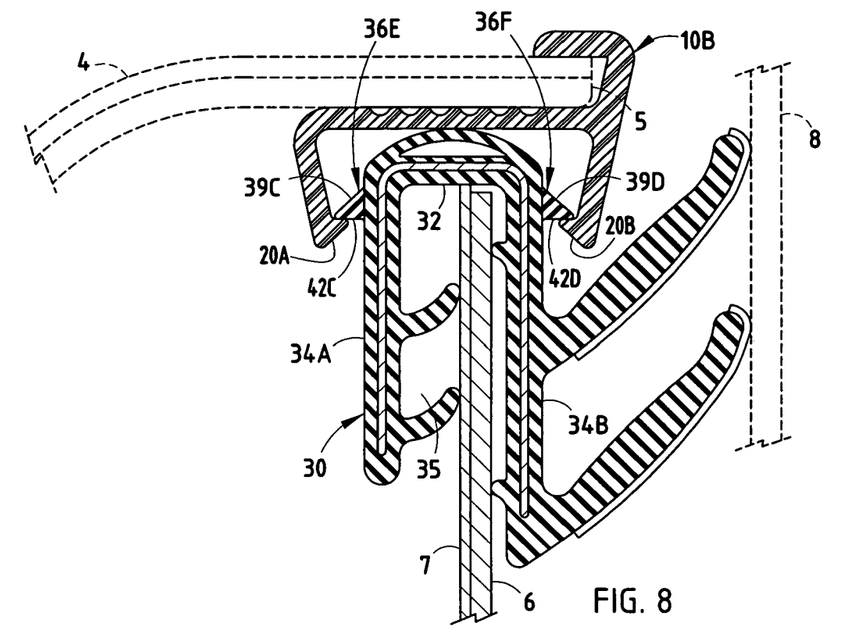
FIG. 8 is a cross-sectional view of yet another embodiment of the vehicle trim panel securement assembly.
Figure 9:
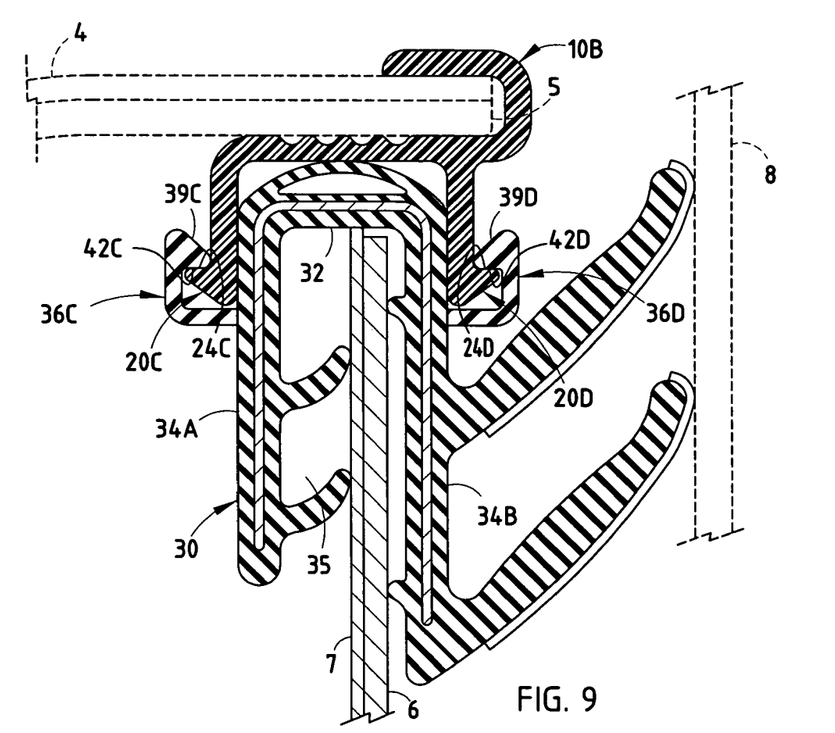
FIG. 9 is a cross-sectional view of still another embodiment of the vehicle trim panel securement assembly.

In another embodiment (FIG. 8), engagement strips 36E and 36F may have ledges 42C and 42D rather than cavities to which protrusions 20A or 20B may reside on for securement. For example, at least one protrusion 39C and 39D may be used to create an edge 42C and 42D which protrusions 20A and 20B may reside on. Still further, FIG. 9 shows an alternative embodiment, wherein protrusions 39C and 39D of panel fastener 10B rather than facing toward one another, face away from one another. This embodiment utilizes engagement strips 36C and 36D which form a shelf 42C and 42D for engagement with corresponding edges 24C and 24D of protrusions 20C and 20D.

Figure 10:
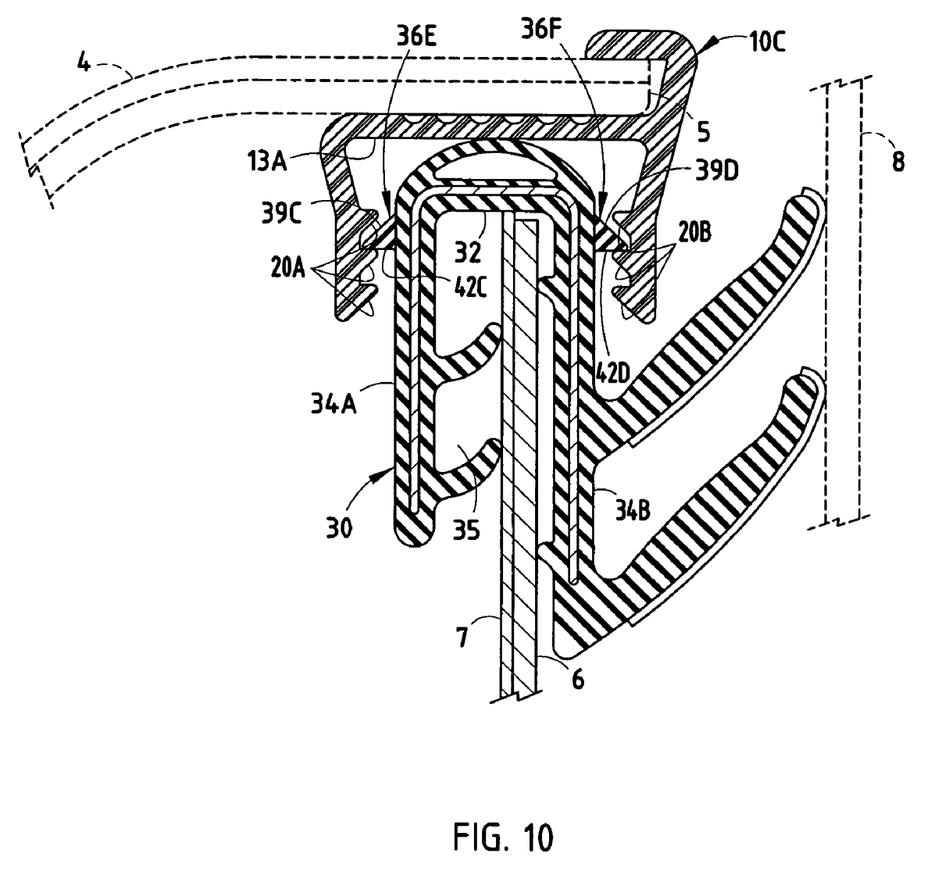
FIG. 10 is a cross-sectional view of yet another embodiment of the vehicle trim panel securement assembly.

In yet another embodiment illustrated in FIG. 10, a plurality of protrusions 20A and 20B are disposed on panel fastener 10C for engagement with strips 36E and 36F which include ledges 42C and 42D. In this embodiment, panel fastener 10C permits on of the plurality of protrusions 20A or 20B to be seated or reside on ledges 42C and 42D, respectively, thereby allowing panel fastener 10C to be optimally positioned with respect to the mount 30 over a wide range of build tolerances between the two vehicle panels. Of course, a plurality of protrusions 20A and 20B on fastener 10C may be used in conjunction with a plurality of receiving members 38A and 38B disposed on engagement strips 36C and 36D in order to provide maximum flexibility.

Panel fastener 10 may be fabricated from numerous materials. Generally, any semi-rigid or rigid material can be used such that arms 18A and 18B are capable of at least slightly flexing. Such materials are commonly known within the art and may include, but are not limited to, a semi-rigid or rigid thermoplastic. Additionally, the method of fabricating panel fastener 10 is not critical to the inventive concept and panel fastener 10 may be molded, extruded, bent or made by any other method generally known in the art. Further, panel fastener 10 may be fabricated from either a single or multiple pieces. However, in the preferred embodiment, panel fastener 10 is molded into a single piece from a semi-rigid, but resilient flexible thermoplastic.

Figure 6:
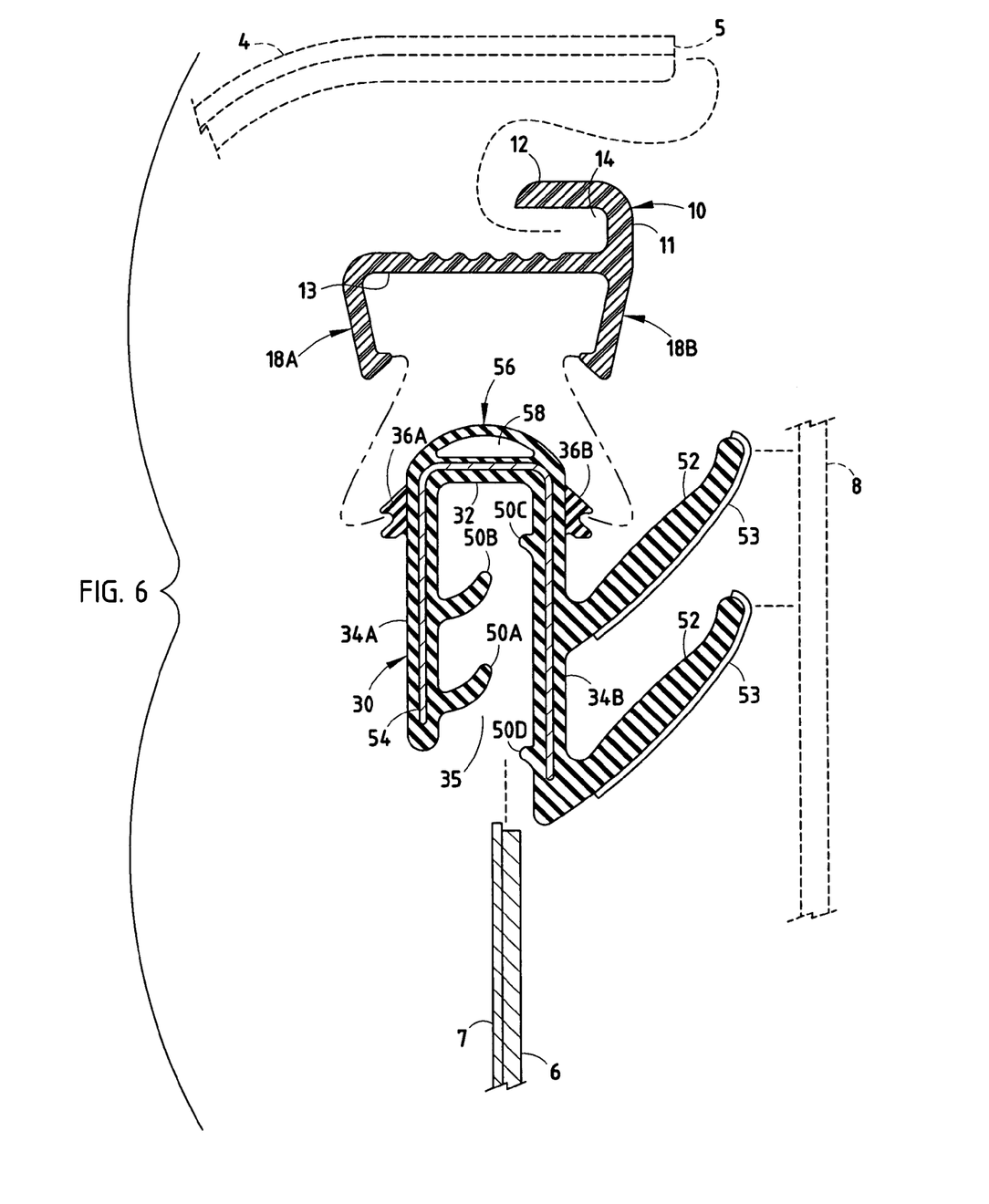
FIG. 6 is an exploded cross-sectional view of the vehicle trim panel securement assembly of FIG. 2.

As shown in FIG. 6, mount 30 generally includes a U-shaped member comprising a base 32, a first leg 34A and a second leg 34B, together defining a channel 35. Channel 35 is used to affix mount 30 to an edge 7 of a vehicle structural panel 6, and includes a plurality of extensions 50A-50D extending from an inside surface of one or both of legs 34A and 34B which affix mount 30 to edge 7. Of course, other attachment methods may also be used.

On the "outside" of leg 34B (the "outside" corresponding to the sides of the legs which are opposite to extensions 50A–50D) there are disposed two wiper blades 52. Blades 52, although not required for the inventive concept, may be used to provide a flexible gasket or seal between mount 30 and a panel surface 8. In one embodiment, panel surface 8 is the window glass of a vehicle door, while the structural panel to which mount 30 is attached, is a vehicle door structural panel. Wipe 52 may also include "flocking" or a felt like material 53, disposed on a surface of the wipe which engages the surface to be sealed to aid the wipe in sliding along the surface when the surface is being positioned (i.e. rolled up or down). Further, and again although not necessary to the inventive concept, mount 30 may also include a more rigid reinforcing frame member 54 disposed centrally within the U-shaped portion of the mount. Reinforcing member 54 aids in the retention of mount 30 to the panel edge by biasing legs 34A and 34B toward one another.

As best seen in FIG. 5, mount 30 also includes a resilient bulbous portion 56 having a cavity 58 formed therein. As best illustrated in FIG. 2, bulbous portion 56 will be compressed when fastener 10 is installed over mount 30, thereby creating a resilient seal which acts to retain fastener 10 and mount 30 in tension to further reduce the movement between the two panels and in turn, reduce any rattling that may occur between the two panels. This resilient seal configuration ensures that fastener 10 and mount 30 remain sealed even when subjected to forces, such as vibrations. Bulbous portion 56 may be formed as an integral part of mount 30 or a separate piece and further, may or may not be made of the same material. In this embodiment, bulbous portion 56 is integral with mount 30 and fabricated from the same material.

Mount 30 may be fabricated from numerous materials and further may be fabricated from more than one material. Generally, a flexible or semi-rigid material may be used for mount 30 while a more rigid material is used for engagement strips 36A and 36B to ensure proper retention of arms 18A and 18B. In one embodiment, this is accomplished by co-extruding a thermoplastic and a rigid thermoplastic, wherein base 32 and legs 34A and 34B of mount 30 are extruded with a thermoplastic such as thermoplastic vulcanizate (TPV) or Ethylene propylene diene monomer (EPDM) while engagement strips 36A and 36B are co-extruded with a more rigid thermoplastic. Additionally, the method of fabricating panel fastener 10 is not critical to the inventive concept and mount 30 may be molded, extruded, bent or fabricated by any other method generally known in the art.

As best seen in FIG. 6, the preferred embodiment of the vehicle trim panel securement assembly 2 is used by installing the C-shaped portion of panel fastener 10 to an edge 5 of a trim panel 4. Panel fastener 10 may be held in place by friction or either alone or in combination with alternative fastening methods such as fasteners or adhesives. Mount 30 is installed by inserting the U-shaped portion onto an edge 7 of a structural panel 6. As with panel fastener 10, mount 30 may be held in place by friction or either alone or in combination with alternative fastening methods such as fasteners or adhesives. Panel fastener 10 (via trim panel 4) is then positioned over mount 30, whereby arms 18A and 18B are aligned with engagement strips 36A and 36B. The trim panel fastener 10 is then pushed over and onto mount 30, whereby ramped surfaces 40A and 40B urge arms 18A and 18B open (FIG. 5), thereby sliding over protrusions 39A and 39B so as to be engage with cavities 38A and 38B. This secures the trim panel from either vertical or horizontal movement with respect to mount 30. The engagement is resisted by resilient bulbous portion 56. The bulbous portion keeps panel fastener 10 in constant tension with mount 30 and further reduces the movement between the two edges of the panels. Simultaneously, this tension reduces any rattling that may occur and provides an additional sealing surface.

In various preferred aspects of the present invention, a novel device and a method are disclosed for securing a trim panel to a structural panel. The device and method of attachment produce a connection which minimizes movement between the two panels, provides a seal, and provides for an appealing aesthetic appearance. The present device and method accomplishes this by providing a novel 2-part attachment system.

The above description is considered that of the preferred embodiments only. Modification of the invention will occur to those skilled in the art and to those who make or use the invention. Therefore, it is understood that the embodiment(s) shown in the drawings and described above are merely for illustrative purposes and not intended to limit the scope of the invention, which is defined by the following claims as interpreted according to the principles of patent law, including the doctrine of equivalents.

The invention claimed is:

1. A vehicle trim panel securement kit, comprising:
a panel fastener adapted to be affixed to a vehicle panel;
a mounting member adapted to be affixed to an edge of a vehicle structural panel, the mounting member having opposite sides, each including first retaining structure, and a base joining at least a pair of spaced legs, whereby when the mounting member is affixed to the structural panel, the legs are disposed on opposite sides of the structural panel;
wherein the panel fastener includes at least a pair of spaced-apart arms having second retaining structures adapted to engage the first retaining structures such that the fastener can be seated on the mounting member with the second retaining structures engaging the first retaining structures to connect the panel fastener to the mounting member.

2. The kit of claim 1, wherein:
the first retaining structures comprise engagement strips; and
the arms each include at least one protrusion adapted to be received by the engagement strip.

3. The kit of claim 2, wherein:
the engagement strips comprise at least one cavity; and
the protrusions are received by the cavities of the engagement strips to retain the panel fastener to the mounting member.

4. The kit of claim 3, wherein:
the at least one protrusion comprises a ramped surface.

5. The kit of claim 3, wherein:
the cavity comprises an elongated groove having a planar sidewall portion;
wherein the protrusions include a planar retaining surface that is configured to abut the planar sidewall portion of the cavity when the panel fastener is connected to the mounting member.

6. The kit of claim 1, wherein:
the second retaining structures comprise at least one transverse protrusion; and
the first retaining structures comprise at least one cavity;
wherein the at least one protrusion is received within the at least one cavity to retain the panel fastener to the mounting member.

7. The kit of claim 6, wherein:
the panel fastener comprises a C-shaped member, the arms extending outward therefrom and the at least one protrusion on each arm directed toward the other, the C-shape member adapted to be affixed to a top edge of a vehicle interior trim panel;
the mounting member comprises a U-shaped member; and
the at least one cavity on each of the legs is directed away from the other.

8. The kit of claim 2, wherein:
the at least one protrusion of the arms include an angled surface and a generally planar surface with respect to the angled surface.

9. The kit of claim 3, wherein:
at least one protrusion of the arms and the at least one cavity of the mounting member are similar in shape and size so as to form a secure engagement when disposed adjacently.

10. The kit of claim 3, wherein:
the at least one cavity includes a plurality of cavities, and the plurality of cavities defined by a plurality of protrusions.

11. The kit of claim 1, wherein:
the mounting member comprises a bulbous portion disposed on the base, the bulbous portion including a cavity therein, the bulbous portion resiliently compressing when the panel fastener is affixed to the mounting member.

12. The kit of claim 2, wherein:
the engagement strip comprises at least one ledge; and
the protrusions are received by the ledge to retain the panel fastener to the mounting member.

13. A vehicle panel assembly, comprising:
a vehicle interior trim panel;
a trim panel fastener adapted to be affixed to the interior trim panel including a pair of spaced apart mount embracing arms;
a vehicle structural panel including a flange along an edge thereof; and
a mount for the fastener adapted to be affixed to the flange of the vehicle structural panel, the mount having a base joining a pair of spaced legs, whereby when the mount is affixed to the flange, the legs are disposed on opposite sides of the flange and extend away from the trim panel fastener;
wherein further the spaced apart mount embracing arms are adapted to be attached to the mount, the fastener arms overlying the mount legs.

14. The assembly according to claim 13, wherein:
the spaced legs include an engagement strip; and
the mount embracing arms include at least one protrusion;
wherein the at least one protrusion is adapted to be received by the engagement strip.

15. The assembly according to claim 14, wherein:
the engagement strip comprises at least one cavity; and
the protrusions are received by the cavity of the engagement strip to retain the panel fastener to the mount.

16. The assembly according to claim 15, wherein:
the at least one protrusion comprises a ramped surface.

17. The assembly according to claim 15, wherein:
the cavity comprises a planar surface configured to receive the protrusions;
wherein the protrusions comprise a planar surface and the planar surface of the protrusions is received by the planar surface of the cavity.

18. The assembly according to claim 13, wherein:
the mount embracing arms include at least one protrusion; and
the mount includes at least one cavity on each of the spaced legs;
wherein the at least one protrusion is received within the at least one cavity to retain the panel fastener to the mount.

19. The assembly according to claim 18, wherein:
the panel fastener comprises a C-shaped member, the spaced arms extending outward therefrom and the at least one protrusion on each arm is directed toward the other, the C-shape member being affixed to a top edge of a vehicles interior trim panel;
the mount comprises a U-shaped member; and
bthe at least one cavity on each of the spaced legs is directed away from the other.

20. The assembly according to claim 15, wherein:
the at least one protrusion of the mount embracing arms and the at least one cavity of the mount are similar in shape and size so as to form a secure engagement when disposed adjacently.

21. The assembly according to claim 15, wherein:
the at least one cavity includes a plurality of cavities defined by a plurality of protrusions.

22. The assembly according to claim 17, wherein:
the mount comprises a resiliently compressible bulbous portion disposed on the base, the bulbous portion including a cavity therein, and wherein the bulbous portion is configured to be resiliently compressed when the panel fastener is affixed to the mount.

23. The assembly according to claim 14, wherein:
the engagement strip comprises at least one ledge; and
the protrusions are received by the ledge to retain the panel fastener to the mount.

24. A method of attaching an interior vehicle panel to a vehicle structural panel, comprising:
providing a panel fastener comprising a pair of arms extending therefrom, each of the arms including at least one protrusion, the panel fastener adapted to be affixed to a vehicle interior panel;
affixing the panel fastener to the vehicle interior panel;
providing a mount adapted to be affixed to an edge of a vehicle structural panel, the mount having a base joining a pair of spaced legs, whereby when the mount is affixed to a vehicle structural panel, the legs are disposed on opposite sides of the structural panel, the mount including at least one cavity disposed on an outside edge of each spaced leg;
affixing the mount to a vehicle structural panel; and
engaging the at least one protrusion on each of the arms to the at least one cavity on the mount.

25. The method according to claim 24, further including:
providing the mount with a bulbous section; and
compressing the bulbous section when the panel fastener is affixed to the mount.

26. The method according to claim 24, further including:
providing an engagement strip on the mount, wherein the at least one cavity is disposed on the engagement strip.

27. The method according to claim 24, further including:
disposing the panel fastener and the mount longitudinally along a top edge of a vehicle door interior trim panel and a top edge of a vehicle's door structure panel, respectively.

* * * * *